United States Patent Office 3,745,032
Patented July 10, 1973

3,745,032
LOW EXPANSION, MULTIBAND TRANSMITTING GLASS
Roger A. Miller, Montclair, and Steven C. Colburn, La Palma, Calif., assignors to General Dynamics Corporation
Filed Sept. 20, 1971, Ser. No. 181,929
Int. Cl. C03c 3/12, 3/30, 3/00
U.S. Cl. 106—47 R          8 Claims

ABSTRACT OF THE DISCLOSURE

Glass compositions are disclosed which have low thermal expansion characteristics and excellent infrared and ultraviolet or radio frequency transmittance characteristics. These compositions are useful in manufacturing domes suitable for housing infrared and ultraviolet or radio frequency detectors such as are used in missile systems. The glasses are basically germanium oxide glasses including suitable amounts of alkali oxides, zinc oxide, calcium oxide, zirconium oxide, aluminum oxide and others. The addition of certain rare-earth oxides, such as ytterbium oxide, give a desirable increase in surface hardness.

BACKGROUND OF THE INVENTION

A number of known glass compositions have good infrared radiation transmittance characteristics, while others have good transmittance in the ultraviolet region. Still other materials have been developed for radar applications which efficiently transmit radio frequency radiation. These known materials, however, are generally incapable of efficiently transmitting both ultraviolet and infrared radiation, or both radio frequency and infrared radiation.

In several applications it is desirable to mount several detectors operating in various radiation bands within a single glass dome. Typical of these applications are missile systems capable of operating in several regions of the electromagnetic spectrum. Countermeasures are very difficult where the missile operates over dual or multi-frequency bands. For example, in a dual IR-RF system, the radar would bring the missile close to the target and the infrared system would do the final homing. Both the radar antenna and the infrared sensor would be located in the nose of the missile, requiring that the missile nose or dome be transparent to both infrared and radio frequency energy.

In such high stress environments, the glass must resist thermal shock resulting from differential heating and must resist surface damage from such sources as rain erosion. Thus, low thermal expansion is important since it is the main property that determines thermal shock resistance and surface hardness is important to reduce erosion or other damage.

Known glasses which have desirable transmission characteristics often do not have acceptable thermal expansion characteristics for use in applications such as missile systems.

Thus, there is a continuing need for glasses having multi-band transmittance, high thermal shock resistance and good surface hardness.

SUMMARY OF THE INVENTION

It is, therefore, an object of this invention to provide a glass composition which overcomes the above-noted problems.

Another object of this invention is to provide a glass composition having improved ultraviolet and infrared transmittance characteristics.

Another object of this invention is to provide a glass composition having improved infrared and radio frequency energy transmittance characteristics.

Still another object of this invention is to provide a glass composition having improved thermal shock and surface hardness characteristics.

The above objects, and others, are accomplished in accordance with this invention by a glass composition comprising from about 40 to about 80 mole percent $GeO_2$, from about 1 to about 15 mole percent CaO, from about 2 to about 10 mole percent ZnO, from about 1 to about 10 mole percent $ZrO_2$, from about 5 to about 16 mole percent MgO, from about 0 to about 15 mole percent $Al_2O_3$ and from about 1 to about 10 mole percent of an alkali oxide selected from the group consisting of $K_2O$, $Na_2O$ and mixtures thereof.

While the glasses within this range have in general excellent infrared ultraviolet and radio frequency energy transmittance characteristics and excellent physical properties such as surface hardness and low thermal expansion, specific glass compositions selected within the ranges given above may be preferred for specific applications. These glasses achieve substantially 80 percent transmittance from about 0.30 micrometer in the ultraviolet range to about 5.5 micrometers in the infrared range. Since infrared reflection losses tend to increase with higher indexes of refraction, for infrared applications a specific glass should be chosen with a lower index of refraction, or an anti-reflection coating having an index of refraction equal to the square root of the substrate index should be used. For radio frequency applications, a specific glass composition with a low dielectric constant and a low loss tangent should be selected. A low dielectric constant will reduce radio frequency reflection losses and permit a thicker mechanical wall to withstand higher stresses. In general, these glasses have low thermal expansion characteristics, allowing the glass structure to resist thermal stresses caused by aerodynamic or other non-uniform heating.

While each of these components contributes to the overall excellent properties of the glass, these properties are more the result of the unique combination than of the individual properties of the components. Germanium oxide is the basic component of the glass since it has been found to provide excellent infrared transmitting properties, together with thermal shock characteristics and chemical durability superior to other infrared transmitting oxides. However, if the proportion of $GeO_2$ is appreciably above or below the range specified above crystallization problems may result.

It is desirable that at least about 2 mole percent alkali oxide content ($K_2O$ and or $Na_2O$) be included since there is a tendency toward crystallization with much smaller amounts and such glasses tend to be refractory and difficult to form. On the other hand, alkali oxide content appreciably above 12 mole percent has been found undesirable because of increased dielectric losses and increased thermal expansion.

The presence of CaO in the range given above improves ultraviolet transmission. However, above 15% the glass becomes refractory and may crystallize.

Inclusion of ZnO in the ranges given above tends to improve the ultraviolet transmittance range and extends the infrared cutoff to slightly longer wavelengths, although it slightly reduces infrared transmittance. Use of ZnO in appreciably greater amounts tends to cause crystallization during annealing.

The addition of $ZrO_2$ in the proportions listed tends to desirably lower the thermal expansion coefficient of the glass. The use of greater amounts of $ZrO_2$ is undesirable since it tends to make the glass too refractory and difficult to melt and pour. Since larger amounts of $ZrO_2$ tend to cause the ultraviolet transmittance cutoff to occur at larger wavelengths, they are not desirable for ultraviolet applications.

The thermal expansion coefficient of the glass is lowered by the addition of MgO in the given range of proportions, increasing thermal shock resistance without changing ultraviolet or infrared transmittance. However, the use of an appreciable larger proportion of MgO is undesirable because of its refractory nature.

Thermal expansion coefficients are significantly lowered by the inclusion of $Al_2O_3$ in the listed range. However, if much greater amounts of $Al_2O_3$ are used, the glass tends to become refractory and difficult to melt and cast.

For optimum multi-band energy transmission, glasses comprising from about 55 to about 72 mole percent $GeO_2$, from about 2 to about 5, mole percent CaO, from about 1 to about 4 mole percent ZnO, from about 1 to about 4 mole percent $ZrO_2$, from about 8 to about 16 mole percent MgO, from about 0 to about 8 mole percent $Al_2O_3$ and from about 1 to about 4 mole percent of an alkali oxide which is preferably made up of from about 0.5 to about 2 mole percent $K_2O$ and from about 0.5 to about 2 mole percent $Na_2O$ are preferred.

For applications, such as missile domes, which require high surface hardness, it is preferred that the glass also include from about 1 to about 5 mole percent of an oxide of a rare earth selected from the group consisting of lanthanum, gadolinium, thorium, ytterbium, and mixtures thereof. In general maximum surface hardness, together with the optimum multi-band transmittance properties, is obtained with about 2 mole percent ytterbium oxide.

If desired, other oxides or other ingredients may be included to improve specific desired properties. For example, small amounts of PbO, $B_2O_3$, $SiO_2$, BaO or $TiO_2$ may be added where certain desired characteristics are improved thereby. However, larger amounts of BaO tend to increase thermal expansion, lowering the thermal shock resistance of the glass. Since $TiO_2$ tends to cause the UV transmittance cutoff to occur at longer wavelengths, large quantities of $TiO_2$ are undesirable in ultraviolet-transmitting applications. Significant amounts of PbO adversely affects ultraviolet transmittance, while $B_2O_3$ and $SiO_2$ tend to reduce the infrared range.

BRIEF DESCRIPTION OF THE DRAWING

Advantages and details of the invention will become further apparent upon reference to the drawing, wherein.

DETAILED DESCRIPTION OF THE INVENTION

As summarized above, it has been found that certain multi-component glasses have both low thermal expansion characteristics and excellent transmission characteristics for infrared, ultraviolet and radio frequency energy. In order to achieve these desirable characteristics, the glass should contain the basic ingredients in the proportions summarized above. In addition, in order to enhance specific properties desirable for specific applications of the glasses, suitable amounts of other ingredients may be added, where suitable.

The glass compositions may be mixed, melted and shaped by any suitable method. Germanate glasses melted in an oxidizing atmosphere tend to have a water/carbon dioxide absorption band between 2.75 and 3.0 which adversely affects the infrared transmission capability of the glass. In order to reduce or eliminate this absorption band, it is preferred that the melting take place in an argon atmosphere to reduce water and carbon dioxide absorption from the furnace atmosphere.

DESCRIPTION OF PREFERRED EMBODIMENTS

The following examples describe various preferred embodiments of the present invention in comparison to conventional glasses. All parts and percentages are by weight unless otherwise indicated.

EXAMPLE I

Figure 1:
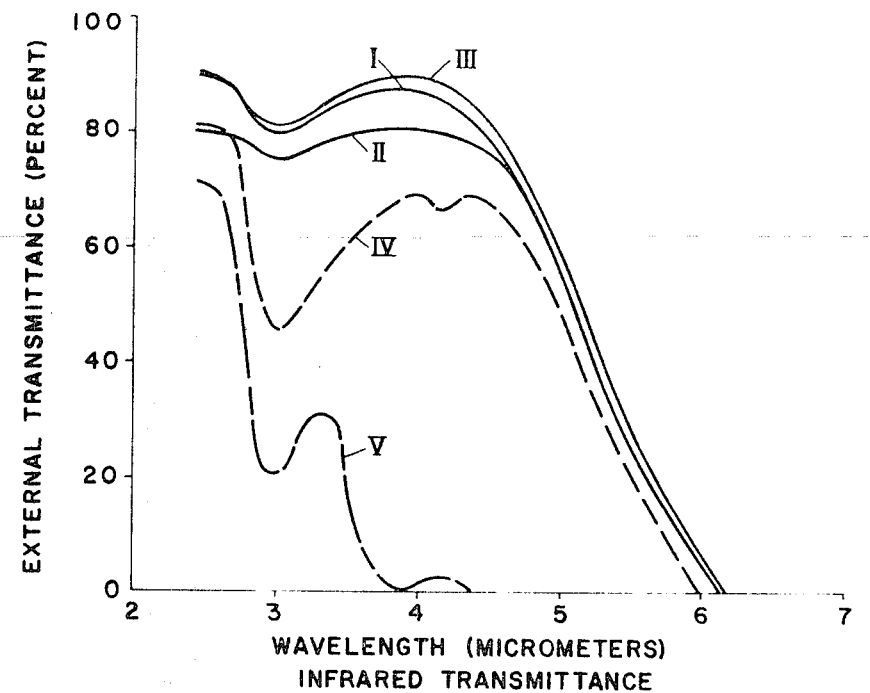
FIG. 1 is a graph showing infrared transmission curves for several preferred embodiments of the glass compositions of this invention and others.
Figure 2:
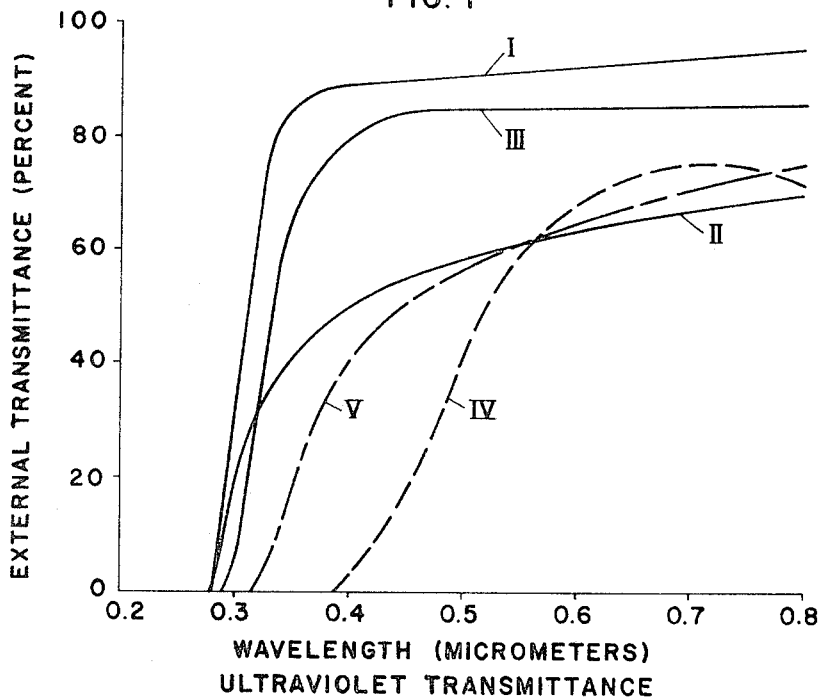
FIG. 2 is a graph showing ultraviolet transmission curves for several preferred embodiments of the glass compositions of the invention and others.

Finely divided oxides are thoroughly mixed together in the following proportions: 72 mole percent $GeO_2$; 1 mole percent $K_2O$; 1 mole percent $Na_2O$; 2 mole percent CaO; 6 mole percent ZnO, 2 mole percent $ZrO_2$, 8 mole percent MgO and 8 mole percent $Al_2O_3$. The mixture, weighing about 20 grams, is melted in a platinum crucible in an electric furnace at a temperature of about 2800° F. The melted glass is allowed to fine for about 3 hours at temperature before pouring into the desired shape for property measurement. The molten glass is cast onto a heated, polished stainless steel plate and annealed at about 1300–1500° F. The resulting coupon has a thickness of about 0.2 inch and a diameter of about 0.75 inch. The coupon is then ground, lapped and polished to a thickness of about 2.01 millimeters. Thermal expansion is then measured with an Orton Automatic Recording Dilatometer. The thermal expansion of this sample is found to be very low; about $57.5 \times 10^{-7}$ in./in./° C. Knoop hardness values are obtained by the technique described by Thibault et al. in "The Measured Knoop Hardness of Hard Substances and Factors Affecting Its Determination," Transactions of the American Society for Metals, vol. 38, pp. 271–330, 1947, using an elongated four-sided diamond pyramid. A Knoop hardness number of 463 is obtained for this sample. The radio frequency loss tangent is measured at 9.375 gHz, and found to be very low, about 0.010. The coupon is then scanned for infrared and ultraviolet transmittance. The resulting transmittance curves are shown in FIGS. 1 and 2 (curves I) for infrared and ultraviolet portions, respectively, of the electromagnetic spectrum. This sample has an outstanding combination of infrared and ultraviolet transmission characteristics. Table I, below, lists the comparative characteristics of interest of this glass and those described in the following examples.

EXAMPLE II

A mixture of finely-divided ingredients is prepared having the following constituents: 72 mole percent $GeO_2$, 1 mole percent $K_2O$, 1 mole percent $Na_2O$, 2 mole percent CaO, 6 mole percent ZnO, 2 mole percent $ZrO_2$, 12 mole percent $Al_2O_3$ and 4 mole percent MgO. About 20 grams of this mixture is melted, cast and annealed as described in Example I, above. After grinding, lapping and polishing, the coupon has a thickness of about 2.08 millimeters. Thermal properties, Knoop hardness and the radar frequency loss tangent of this sample, measured as described in Example I, are obtained. The results are thermal expansion of about $54.9 \times 10^{-7}$ in./in./° C., Knoop hardness of about 447 and loss tangent of about 0.010. The coupon is then scanned for infrared and ultraviolet transmittance, with results as shown in FIGS. I and II (curves II). This sample has excellent infrared and ultraviolet transmittance characteristics. The characterics of this glass are given in Table I, below.

EXAMPLE III

A mixture of finely-divided ingredients is carefully mixed in the following proportions: 70 mole percent $GeO_2$, 1 mole percent $K_2O$, 1 mole percent $Na_2O$, 2 mole percent CaO, 6 mole percent ZnO, 2 mole percent $ZrO_2$, 8 mole percent MgO, 8 mole percent $Al_2O_3$, and 2 mole percent $Yb_2O_3$. This sample is melted, cast and annealed as described in Example I, above. After grinding, lapping and polishing, the coupon has a thickness of about 2.06 mm. Hardness is measured as described in Example I and a Knoop hardness value of 633 is obtained. The coupon is then scanned for infrared and ultraviolet transmittance characteristics, and the results are shown in FIGS. I and II as curves III. The characteristics of this glass are summarized in Table I, below.

EXAMPLES IV-V

For comparative purposes, two glasses of compositions which are generally similar to the glasses of this invention but which certain other well-known glass ingredients which we have found to be undesirable for our purposes, are prepared in the manner described in Example I. Infrared and ultraviolet transmittance characterstics are measured. The glass of Example IV consists of 55 mole percent $GeO_2$, 1 mole percent $K_2O$, 1 mole percent $Na_2O$, 6 mole percent CaO, 6 mole percent PbO, 2 mole percent BaO, 11 mole percent ZnO, 4 mole percent $TiO_2$, 2 mole percent $ZrO_2$ and 12 mole percent MgO, while theg lass of Example V consists of 55 mole percent $GeO_2$, 6 mole percent $B_2O_3$, 1 mole percent $K_2O$, 1 mole percent $Na_2O$, 2 mole percent BaO, 11 mole percent ZnO, 4 mole percent $TiO_2$, and 12 mole percent MgO. Each sample is melted, cast and annealed and then ground, lapped and polished as described in Example I. Sample IV has a thickness of about 4.04 mm. and sample V a thickness of about 4.09 mm. Infrared and ultraviolet transmittance characteristics are measured and plotted in FIGS. 1 and 2 (curves III and IV). As can be seen from the curves, the glass of sample IV has relatively poor ultraviolet transmission characteristics, while the glass of sample V has relatively poor infrared transmission. Further tests of similar glasses with varying proportions of PbO and $B_2O_3$ shows that increasing amounts of PbO degrades ultraviolet transmission, while increasing amounts of $B_2O_3$ degrades infrared transmission. The characteristics of these glasses are tabulated in Table I, below.

EXAMPLES VI-XVII

A number of additional glasses are prepared, varying the proportions of the various oxides. Samples are prepared and tested as described in Example I. The compositions of these glasses, and the results obtained, are presented in Table I. These examples illustrate the changes in glass characteristics with changes in oxide proportions. As can be seen, specific glass composition for specific purposes can be selected within the range of compositions found to give improved multi-band transmittance characteristics.

EXAMPLES XVIII-XXII

A number of glasses are prepared based on the composition described in Example I, in each case with about 2 mole percent of a rare earth oxide other than the $Yb_2O_3$ of Example III. In each case the proportion of $GeO_2$ reduced from 72 to 70 mole percent. These rare earth oxides are found to improve the hardness of the glasses while only slightly varying their transmission characteristics. The comparative results of thee tests are also illustrated in Table I, below.

TABLE I

| Example | Mole percent oxides in glass | | | | | | | | | | | Results | | | |
|---|---|---|---|---|---|---|---|---|---|---|---|---|---|---|---|
| | $GeO_2$ | $K_2O$ | $Na_2O$ | CaO | BaO | ZnO | $Al_2O_3$ | $TiO_2$ | $ZrO_2$ | MgO | Rare earth or other | Infrared transmission | Ultraviolet transmission | Knoop hardness | Loss tangent, 9.375 GHz | Thermal expansion, $\times 10^{-7}$ in./in./°C |
| I | 72 | 1 | 1 | 2 | 0 | 6 | 8 | 0 | 2 | 8 | 0 | Excellent | Excellent | 463 | 0.011 | 57.5 |
| II | 72 | 1 | 1 | 2 | 0 | 6 | 12 | 0 | 2 | 4 | 0 | do | Good | 447 | 0.010 | 54.9 |
| III | 70 | 1 | 1 | 2 | 0 | 6 | 8 | 0 | 2 | 8 | 2 $Yb_2O_3$ | do | Excellent | 633 | | |
| IV | 55 | 1 | 1 | 6 | 2 | 11 | 0 | 4 | 2 | 12 | 6 PbO | Good | Poor | 546 | 0.008 | 74.5 |
| V | 55 | 1 | 1 | 0 | 2 | 11 | 0 | 4 | 0 | 12 | 6 $B_2O_3$ | Poor | Fair | 561 | | 61.1 |
| VI | 59 | 1 | 1 | 8 | 0 | 11 | 0 | 4 | 2 | 12 | 0 | Good | Excellent | 539 | 0.008 | 68.2 |
| VII | 59 | 1 | 1 | 11 | 0 | 0 | 0 | 4 | 2 | 12 | 0 | do | do | 610 | | 66.2 |
| VIII | 66 | 1 | 1 | 6 | 0 | 0 | 0 | 4 | 2 | 12 | 0 | Very good | Good | 480 | 0.008 | 60.7 |
| IX | 72 | 1 | 1 | 6 | 0 | 6 | 0 | 4 | 2 | 12 | 0 | Good | Very good | 501 | 0.008 | 60.6 |
| X | 72 | 0.5 | 0.5 | 6 | 2 | 6 | 0 | 4 | 2 | 12 | 0 | Very good | Excellent | 544 | 0.008 | 70.2 |
| XI | 72 | 2 | 2 | 6 | 2 | 8 | 0 | 4 | 2 | 12 | 0 | do | Good | [1] 221 | | 67.3 |
| XII | 72 | 1 | 1 | 2 | 0 | 6 | 8 | 0 | 2 | 8 | 0 | do | do | 498 | | 69.1 |
| XIII | 72 | 1 | 1 | 2 | 0 | 6 | 4 | 8 | 4 | 12 | 0 | Very good | Very good | 469 | 0.014 | 69.4 |
| XIV | 72 | 1 | 1 | 2 | 0 | 6 | 12 | 0 | 0 | 2 | 0 | do | do | 429 | 0.009 | 64.7 |
| XV | 72 | 1 | 1 | 2 | 0 | 6 | 12 | 0 | 4 | 2 | 0 | Good | Good | 574 | 0.010 | 54.5 |
| XVI | 72 | 1 | 1 | 2 | 0 | 10 | 8 | 0 | 2 | 2 | 0 | do | Very good | 498 | 0.009 | 55.6 |
| XVII | 70 | 1 | 1 | 2 | 0 | 6 | 8 | 0 | 2 | 6 | 0 | Excellent | Good | 447 | | 57.1 |
| XVIII | 70 | 1 | 1 | 2 | 0 | 6 | 8 | 0 | 2 | 8 | 2 $La_2O_3$ | do | Excellent | 498 | | |
| XIX | 70 | 1 | 1 | 2 | 0 | 6 | 8 | 0 | 2 | 8 | 2 $Gd_2O_3$ | do | do | 582 | | |
| XX | 70 | 1 | 1 | 2 | 0 | 6 | 8 | 0 | 2 | 8 | 2 $ThO_2$ | do | do | 534 | | |
| XXI | 70 | 1 | 1 | 2 | 0 | 6 | 8 | 0 | 2 | 8 | 2 $Cs_2O$ | do | do | 504 | | |
| XXII | 70 | 1 | 1 | 2 | 0 | 6 | 8 | 0 | 2 | 8 | 2 $Ga_2O_3$ | Very good | do | 550 | | |

[1] Crystals gave poor indentation and therefore inaccurate hardness reading.

Although specific proportions and ingredients were given and detailed processing steps were described, in the above description of preferred embodiments, these may be varied within the scope of this invention with similar results. Other ingredients may also be added to the glass composition of this invention where suitable, to enhance or modify desired characteristics.

Various other ramifications, modifications and applications of this invention will become apparent to those skilled in the art upon reading this disclosure. These are intended to be included within the scope of this invention, or defined in the appended claims.

We claim:

1. A multiband electromagnetic energy transmitting glass consisting of about 40 to about 80 mole percent $GeO_2$, from about 1 to about 15 mole percent CaO, from about 2 to about 10 mole percent ZnO, from about 1 to about 10 mole percent $ZrO_2$, from about 5 to about 16 mole percent MgO, from about 0 to about 15 mole percent $Al_2O_3$ and from about 1 to about 10 mole percent of an alkali oxide selected from the group consisting of $K_2O$, $Na_2O$ and mixtures thereof.

2. The glass according to claim 1 further consisting of about 1 to about 5 mole percent of an oxide of a rare earth selected from the group consisting of lanthanum, gadolinum, thorium, ytterbium and mixtures thereof.

3. The glass according to claim 1 further consisting of about 2 mole percent ytterbium oxide.

4. A multiband electromagnetic energy transmitting glass consisting of about 55 to about 72 mole percent $GeO_2$, from about 2 to about 5 mole percent CaO, from about 5 to about 7 mole percent ZnO, from about 1 to about 4 mole percent $ZrO_2$, from about 8 to about 16 mole percent MgO, from about 0 to about 8 mole percent $Al_2O_3$, and from about 1 to about 4 mole percent of an alkali oxide selected from the group consisting of $K_2O$, $Na_2O$ and mixtures thereof.

5. The glass according to claim 4 further consisting of about 1 to about 5 mole percent of an oxide of a rare earth selected from the group consisting of lanthanum, gadolinum, thorium, ytterbium and mixtures thereof.

6. The glass according to claim 4 further consisting of about 2 mole percent ytterbium oxide.

7. A glass having improved ultraviolet and infrared energy characteristics comprising about 70 mole percent $GeO_2$, about 2 mole percent CaO, about 2 mole percent $ZrO_2$, about 8 mole percent $Al_2O_3$, about 8 mole percent MgO, about 6 mole percent ZnO, about 2 mole percent $Yb_2O_3$ and about 2 mole percent of an alkali oxide selected from the group consisting of $K_2O$, $Na_2O$ and mixtures thereof.

8. A glass having improved radio frequency and infrared energy transmission characteristics comprising about 70 mole percent $GeO_2$, about 2 mole percent CaO, about 2 mole percent ZrO, about 16 mole percent MgO, about 6 mole percent ZnO, about 2 mole percent $Yb_2O_3$ and about 2 mole percent of an alkali oxide selected from the group consisting of $K_2O$, $Na_2O$ and mixtures thereof.

References Cited

UNITED STATES PATENTS

| 3,119,703 | 1/1964 | Cleek et al. | 106—47 R |
| 3,320,043 | 5/1967 | Mackenzie | 106—47 R |
| 3,531,305 | 9/1970 | Dumbaugh, Jr. | 106—47 Q |
| 3,674,455 | 7/1972 | Dugger | 106—47 R |

FOREIGN PATENTS

| 1,510,554 | 1/1968 | France | 106—47 Q |

WINSTON A. DOUGLAS, Primary Examiner

M. L. BELL, Assistant Examiner

U.S. Cl. X.R.

252—300